(12) United States Patent
Wescott

(10) Patent No.: US 6,223,323 B1
(45) Date of Patent: Apr. 24, 2001

(54) METHOD FOR STORING PARITY INFORMATION IN A DISK ARRAY STORAGE SYSTEM

(75) Inventor: Michael C. Wescott, Columbia, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/118,678

(22) Filed: Jul. 17, 1998

(51) Int. Cl.$^7$ .................................................. G11C 29/00
(52) U.S. Cl. ............................................ 714/770; 714/801
(58) Field of Search .................................. 714/767, 770, 714/769, 805, 801

(56) References Cited

U.S. PATENT DOCUMENTS

| | | | |
|---|---|---|---|
| 5,388,108 | * | 2/1995 | DeMoss et al. ............... 714/805 |
| 5,630,007 | * | 5/1997 | Kobayashi et al. ............ 386/113 |
| 5,856,989 | * | 1/1999 | Oldfields et al. .............. 714/801 |
| 5,867,640 | * | 2/1999 | Aguilar et al. ............. 395/182.04 |
| 5,892,780 | * | 4/1999 | Munetoh et al. .............. 714/801 |

* cited by examiner

*Primary Examiner*—Albert Decady
*Assistant Examiner*—David Ton
(74) *Attorney, Agent, or Firm*—James M. Stover

(57) ABSTRACT

An improved disk array storage system shared by first and second processing nodes is comprised of N+2 disks wherein N disk drives are used to store data, and two additional disk drives are provided for the storage of parity information. Data to be saved is divided into portions consisting of one or many blocks of data for storage among the disks. Corresponding parity information, comprised of first and second components, is written to the two dedicated parity disk drives. The first processing node determines the first component of parity information to be written to the first parity disk drive, and a second processing node determines the second component of parity information to be written to the second parity disk drive. The two components of parity information are determined so that the exclusive-OR combination of the first and second components is equivalent to the exclusive-OR combination of the data stored across the remaining data disk drives.

22 Claims, 4 Drawing Sheets

METHOD FOR STORING PARITY INFORMATION IN A DISK ARRAY STORAGE SYSTEM

The present invention relates to disk array storage devices for computer systems and, more particularly, to an improved method for generating parity information in a disk array storage system.

BACKGROUND OF THE INVENTION

A disk array or RAID (Redundant Array of Inexpensive Disks) storage system comprises two or more hard disk drives, such as the commodity 3½ inch disk drives currently used in personal computers and workstations, functioning together as a single storage system. Although disk array products have been available for several years, significant improvements in the reliability and performance of small disk drives and a decline in the cost of such drives, together with end user requirements for increased system storage capacity, faster access speeds, improved reliability, and greater resistance to errors have resulted in enhanced interest in RAID systems.

Several disk array design alternatives were first described in an article titled "A Case for Redundant Arrays of Inexpensive Disks (RAID)" by David A. Patterson, Garth Gibson and Randy H. Katz; University of California Report No. UCB/CSD 87/391, December 1987. This article discusses disk arrays and the improvements in performance, reliability, power consumption and scalability that disk arrays provide in comparison to single large magnetic disks. Five disk array arrangements, referred to as RAID levels, are described. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One or more additional disks are utilized to store error check or parity information.

In 1993, these RAID levels were formalized in the first edition of the RAIDBook, published by the RAID Advisory Board, an association of manufacturers and consumers of disk array storage systems. In addition to the five RAID levels described by Patterson et al., the RAID Advisory Board now recognizes four additional RAID levels, including RAID level 0, RAID level 6, RAID level 10 and RAID level 53.

In order to coordinate the operation of the multitude of disk or tape drives within an array to perform read and write functions, parity generation and checking, and data restoration and reconstruction, complex storage management techniques are required. Array operation can be managed through software routines executed by the host computer system, i.e., a software array architecture, or by a dedicated hardware controller constructed to control array operations.

A RAID level 4 disk array is comprised of N+1 disks wherein N disks are used to store data, and the additional disk is utilized to store parity information. Data to be saved is divided into portions consisting of one or many blocks of data for storage among the disks. The corresponding parity information, which can be calculated by performing a bit-wise exclusive-OR of corresponding portions of the data stored across the N data drives, is written to the dedicated parity disk. The parity disk is used to reconstruct information in the event of a disk failure. Writes typically require access to two disks, i.e., one of the N data disks and the parity disk, as will be discussed in greater detail below. Read operations typically need only access a single one of the N data disks, unless the data to be read exceeds the block length stored on each disk.

A RAID level 4 system including five data and parity disk drives, DRIVE A through DRIVE E is illustrated in FIG. 1. An array controller, not shown, coordinates the transfer of data between a host system and the array disk drives. The controller also calculates and checks parity information. Data blocks A0 through D4 and parity blocks P0 through P4 illustrate the manner in which data and parity is stored on the five array drives. Data blocks A0 through D4 are also identified as blocks 0 through 19.

RAID level 5 disk arrays are similar to RAID level 4 systems except that parity information, in addition to the data, is distributed across the N+1 disks in each group. Each one of the N+1 disks within the array includes some blocks for storing data and some blocks for storing parity information. Where parity information is stored is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations.

A RAID level 5 system including five data and parity disk drives, DRIVE A through DRIVE E is illustrated in FIG. 3. An array controller, not shown, coordinates the transfer of data between a host system and the array disk drives. The controller also calculates and checks parity information. Data blocks A0 through E4 and parity blocks P0 through P4 illustrate the manner in which data and parity is stored on the five array drives. Data blocks A0 through E4 are also identified as blocks 0 through 19.

The relationship between the parity and data blocks in both the RAID level 4 and 5 systems described above, and illustrated in FIGS. 1 and 3, respectively, is as follows:

PARITY P0=(BLOCK 0)$\oplus$(BLOCK 1)$\oplus$(BLOCK 2)$\oplus$(BLOCK 3)
PARITY P1=(BLOCK 4)$\oplus$(BLOCK 5)$\oplus$(BLOCK 6)$\oplus$(BLOCK 7)
PARITY P2=(BLOCK 8)$\oplus$(BLOCK 9)$\oplus$(BLOCK 10)$\oplus$(BLOCK 11)
PARITY P3=(BLOCK 12)$\oplus$(BLOCK 13)$\oplus$(BLOCK 14)$\oplus$(BLOCK 15)

As shown above, parity data can be calculated by performing a bit-wise exclusive-OR of corresponding portions of the data stored across the N data drives. However, because each parity bit is simply the exclusive-OR product of all the corresponding data bits from the data drives, new parity can be more easily determined from the old data and the old parity as well as the new data in accordance with the following equation:

new parity=old data$\oplus$new data$\oplus$old parity.

Although the parity calculation for RAID levels 4 or 5 shown in the above equation is much simpler than performing a bit-wise exclusive-OR of corresponding portions of the data stored across all of the data drives, a typical RAID level 4 or 5 write operation will require a minimum of two disk reads and two disk writes, in addition to the step of calculating the new parity information. This operation is referred to as a read-modify-write (RMW) operation. More than two disk reads and writes are required for data write operations involving more than one data block. Each individual disk read operation involves a seek and rotation to the appropriate disk track and sector to be read. The seek time for all disks is therefore the maximum of the seek times of each disk. A RAID level 4 or 5 system thus carries a significant write penalty when compared with a single disk storage device or with RAID level 1, 2 or 3 systems.

In addition to the advantages described above for RAID storage systems, i.e., increased system storage capacity, faster access speeds, improved reliability, RAID level 4 and 5 disk array systems also provide for concurrent read and write operations. These storage arrangements provide an increased transfer bandwidth for multiple block read and write operations, e.g., four consecutive blocks can be read or written concurrently, and also improves the performance of small transfer operations by allowing blocks residing on separate disk drives to be accessed in parallel.

An improved method for generating and maintaining parity information in a RAID level 4 or 5 system which reduces or eliminates the write penalty resulting from the manner in which parity information is traditionally calculated and maintained is desired.

OBJECTS OF THE INVENTION

It is therefore an object of the present invention to provide a new and useful method for updating data and parity information within a disk array.

It is another object of the present invention to provide such a method which optimally executes read-modify-write procedures within RAID level 4 and 5 disk arrays.

It is yet another object of the present invention to provide a new and useful method for improving the efficiency of disk drive utilization within a disk array.

It is still a further object of the present invention to provide a new and useful method for minimizing I/O service times and I/O queue waiting times for individual drives within a disk array.

SUMMARY OF THE INVENTION

There is provided, in accordance with the present invention, an improved disk array storage system comprised of N+2 disks wherein N disk drives are used to store data, and two additional disk drives are provided for the storage of parity information. Data to be saved is divided into portions consisting of one or many blocks of data for storage among the disks. Corresponding parity information, comprised of first and second components, is written to the two dedicated parity disk drives. A first parity generating mechanism is employed for calculating the first component of parity information to be written to the first parity disk drive, and a second parity generating mechanism is employed for calculating the second component of parity information to be written to the second parity disk drive. The two components of parity information are determined so that the exclusive-OR combination of the first and second components is equivalent to the exclusive-OR combination of the data stored across the remaining data disk drives.

In the described system, the disk array storage system is shared by first and second processing nodes. The first processing node processes a first group of processes performing updates on the data stored in the disk array storage system and includes the first parity generating mechanism for calculating the parity information to be maintained within the first parity disk drive. Similarly, the second processing node processes a second group of processes performing updates on the data stored in the disk array storage system and includes the second parity generating mechanism for calculating the parity information to be maintained within the second parity disk drive.

In another embodiment of the invention, each one of the N+2 disk drives within the disk array storage system includes some blocks for storing data and some blocks for storing parity information. The data and parity information is organized into multiple data groups within the array, each data group including a corresponding storage block from each disk drive. N storage blocks within each data group are utilized to store data and two storage blocks within each data group are utilized to store first and second components of parity information. The location of the two storage blocks utilized to store the first and second components of parity information varies in the different data groups.

The first parity generating mechanism is employed for calculating the first components of parity information, and the second parity generating mechanism is employed for calculating the second components of parity information. Within each data group, the two components of parity information are determined so that the exclusive-OR combination of the first and second components is equivalent to the exclusive-OR combination of the data stored in the corresponding storage blocks across the remaining data disk drives.

The above objects and other objects, features, and advantages of the present invention will become apparent from the following detailed specification when read in conjunction with the accompanying drawings in which applicable reference numerals have been carried forward.

DETAILED DESCRIPTION OF THE PREFERRED EMBODIMENT

RAID Level 4 Disk Array Implementation

Figure 1:
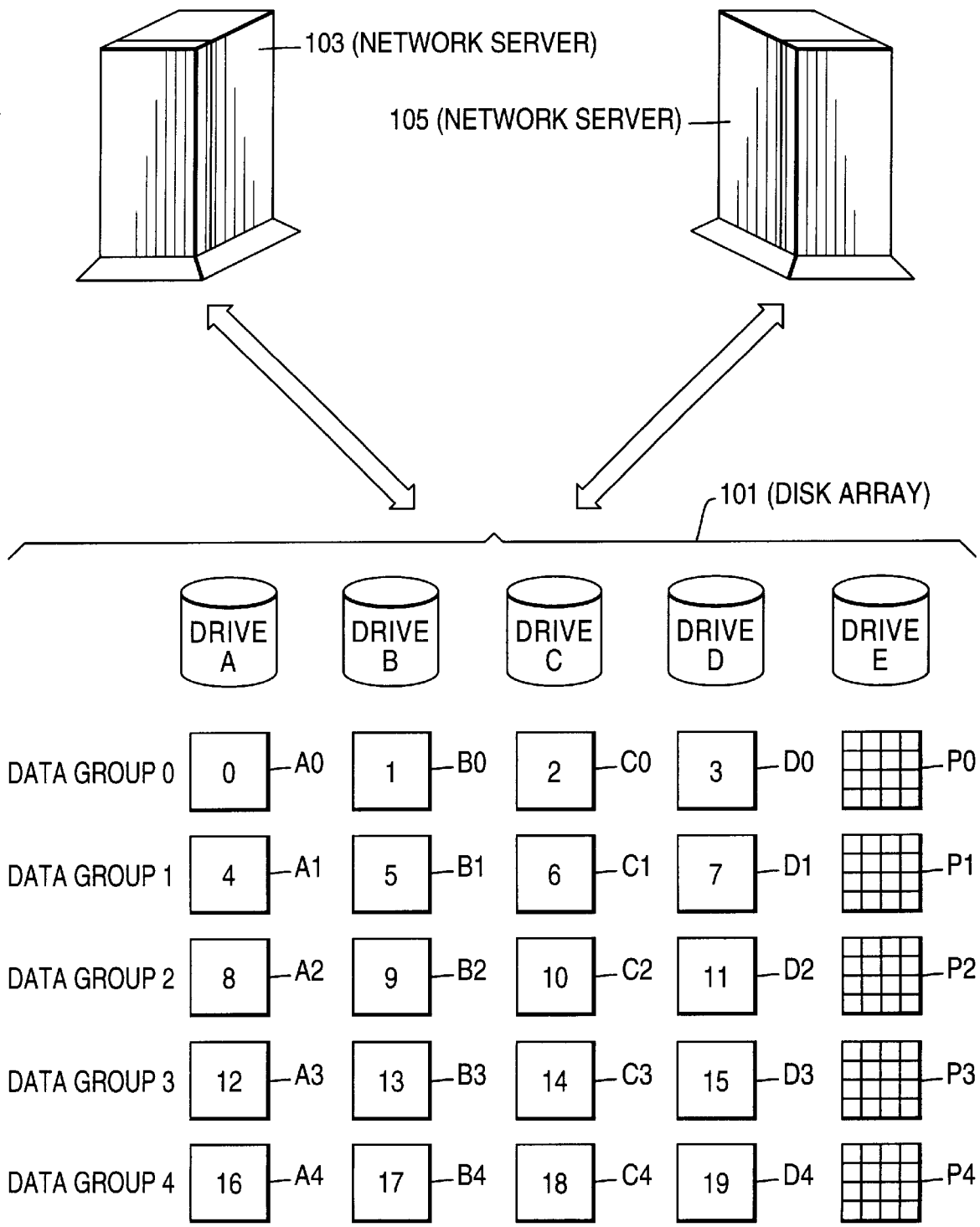
FIG. 1 is a block diagram representation of a network including a shared RAID level 4 disk array storage system including four disk drives for the storage of data and an additional disk drive for the storage of parity information in accordance with the prior art.

FIG. 1 illustrates a RAID level 4 disk array storage system 101 utilized as a shared storage device accessible by two or more network servers 103 and 105. The RAID level 4 disk array storage system 101 includes four disk drives for the storage of data, identified as DRIVE A through DRIVE D, and an additional disk drive for the storage of parity information, identified as DRIVE E.

As shown in FIG. 1, the data stored within RAID level 4 disk array system 101 is saved horizontally across the disk drives, i.e., successive data blocks are stored in successive disk drives. Data is written in blocks across disk drives DRIVE A through DRIVE D. Parity information is calculated by performing a bit-wise exclusive-OR of corresponding data blocks from disk drives DRIVE A through DRIVE D, or through a read-modify-write operation, then saved to a corresponding storage block on disk drive RIVE E. The exemplary RAID level 4 array storage system of FIG. 1 provides storage for twenty data blocks of data organized into five data groups. The data groups, identified as Data Group 0 through Data Group 4, each provide for the storage of four data blocks and one parity block. The data blocks, numbered 0 through 19, are identified by reference numerals A0 through D4. Parity blocks are identified by reference numerals P0 through P4.

Parity information is calculated by performing a bit-wise exclusive-OR of corresponding data blocks stored across the four data drives, or through the read-modify-write (RMW) operation discussed above.

Although only five data groups and twenty data blocks are illustrated, it should be understood that an array storage system utilizing current magnetic disk drives, such as the Western Digital Corporation WD Caviar AC36400 disk drive described above, is capable of storing millions of data blocks.

The single dedicated parity disk, DRIVE E, within the disk array storage system 101 can severely limit the performance of the storage system during concurrent write operations or data reconstruction activities since all write and data reconstruction operations require access to the single parity drive. The improved disk array storage system illustrated in FIG. 2 greatly reduces the bottlenecks resulting from the use of a single dedicated parity disk in a RAID level 4 disk array storage system.

Figure 2:
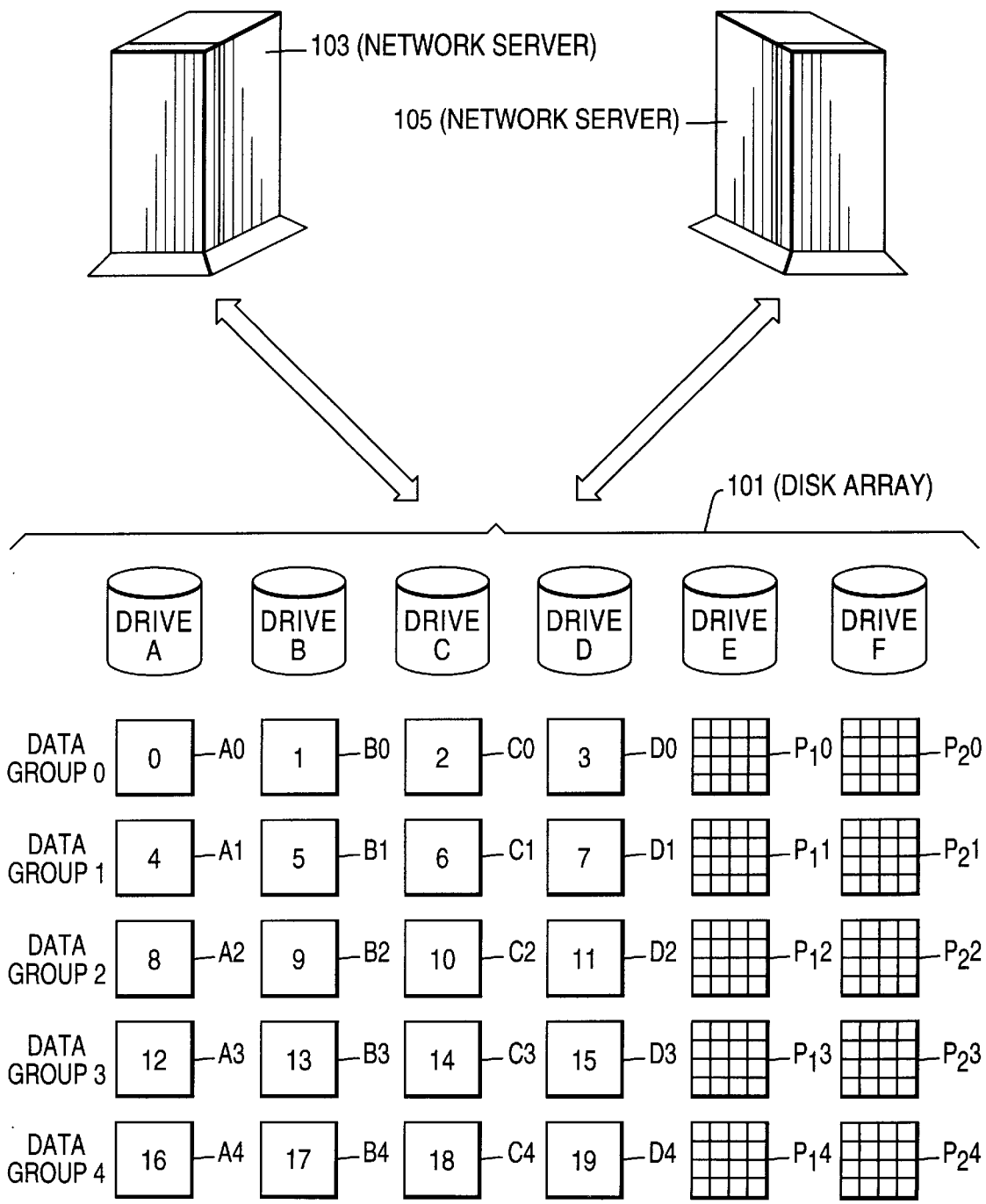
FIG. 2 is a block diagram representation of a network including a shared RAID level 4 disk array storage system including four disk drives for the storage of data and two additional disk drives for the storage of parity information in accordance with the present invention.

The system depicted in FIG. 2 is similar to that illustrated in FIG. 1: a disk array storage system 101 utilized as a shared storage device accessible by two or more network servers 103 and 105. The disk array storage system 101 includes four disk drives for the storage of data, identified as DRIVE A through DRIVE D, but in contrast to the system of FIG. 1, the system depicted in FIG. 2 includes two disk drives for the storage of parity information, identified as DRIVE E and DRIVE F.

The disk array storage system illustrated in FIG. 2 provides storage for twenty data blocks of data organized into five data groups. The data groups, identified as Data Group 0 through Data Group 4, each provide for the storage of four data blocks and two parity blocks. The data blocks, numbered 0 through 19, are identified by reference numerals A0 through D4. Parity blocks are identified by reference numerals $P_1 0$ through $P_1 4$ and $P_2 0$ through $P_2 4$.

Parity information saved to DRIVE E, i.e., $P_1 0$ through $P_1 4$, is calculated by server 103, while parity information saved to DRIVE F, i.e., $P_2 0$ through $P_2 4$, is calculated by server 105. Each server is responsible for updating its component of parity information for specific data modifications. For example, server 103, might be responsible for the parity generations associated with all data modifications originating with server 103, while server 105 would be responsible for the parity generations associated with all data modifications originating with server 105. Other methods for determining which server has responsibility for which data modifications and associated parity updates should be readily apparent to those skilled in the art. Each server determines parity through the read-modify-write operation as follows:

new parity $P_1 X$=old data$\oplus$new data$\oplus$old parity $P_1 X$; and new parity $P_2 X$=old data$\oplus$new data$\oplus$old parity $P_2 X$;

where parity $P_1$ is the parity information component saved to DRIVE E, parity $P_2$ is the parity information component saved to DRIVE F, and X represents the data group for which parity is calculated.

Initially, all data disks and both parity disks will contain all zeros data. Alternatively, the array may preloaded with data, in which case parity will need to be calculated and written to one of the two parity disks, the other disk containing all zeros. Over time, however, as each server writes new data and parity to the disk array storage system 101, neither parity information component $P_1$ or $P_2$ individually will represent the parity value determined by performing a bit-wise exclusive-OR of corresponding data blocks stored across the four data drives. However, because the exclusive-OR operation utilized to calculate parity is both associative and commutative, the complete parity for the disk array storage system can be determined by exclusive-ORing corresponding parity blocks from DRIVE E and DRIVE F. The complete parity for any data group X can be determined from the following equation:

parity $P=P_1 X \oplus P_2 X$.

RAID Level 5 Disk Array Implementation

Figure 3:
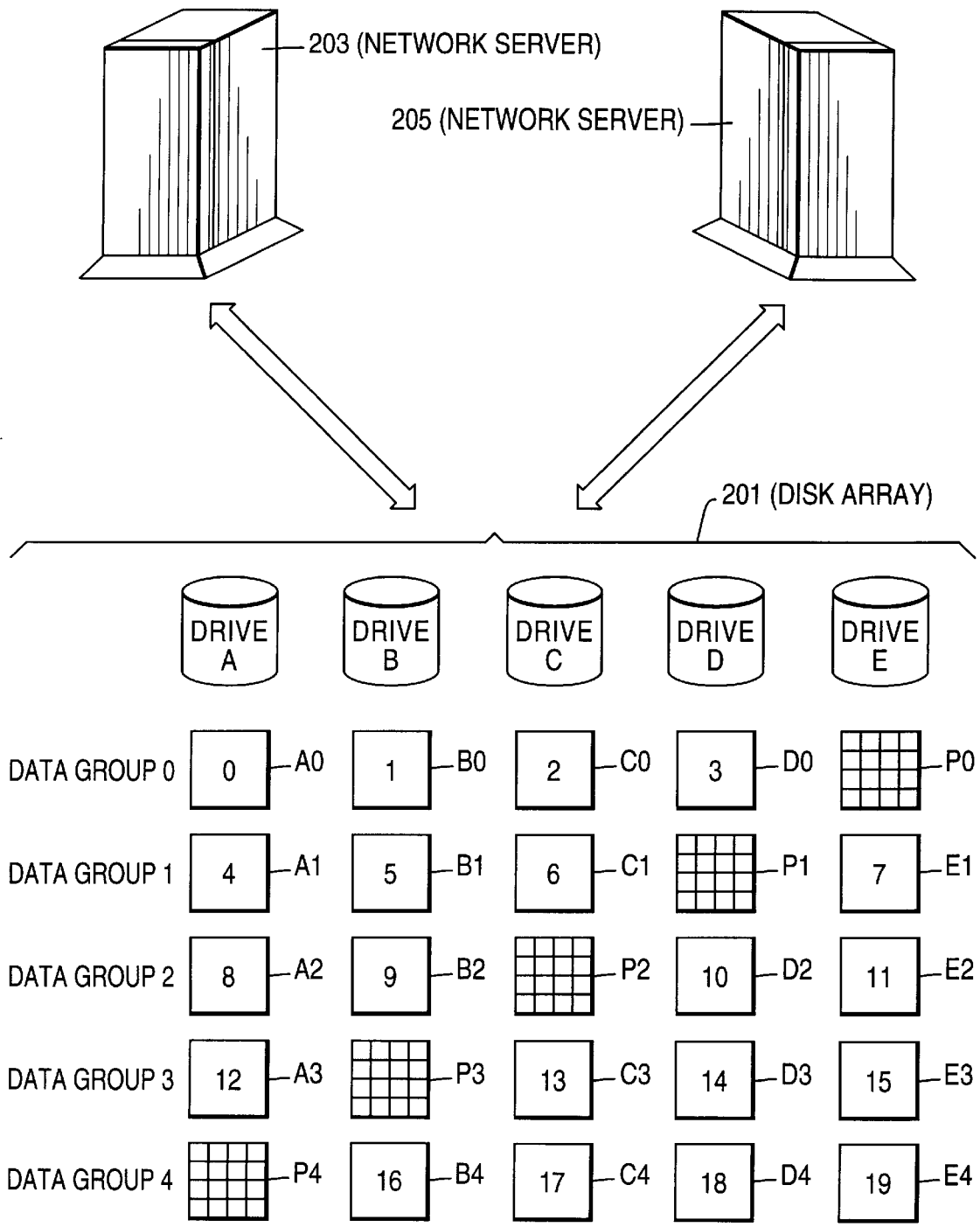
FIG. 3 is a block diagram representation of a network including a shared RAID level 5 disk array storage system including five disk drives for the storage of data and parity information in accordance with the prior art.

FIG. 3 illustrates a RAID level 5 disk array storage system 201 utilized as a shared storage device accessible by two or more network servers 203 and 205. The RAID level 5 disk array storage system 201 includes five disk drives for the storage of data and parity information, identified as DRIVE A through DRIVE E.

As shown in FIG. 3, the exemplary RAID level 5 array storage provides storage for twenty data blocks of data organized into five data groups. The data groups, identified as Data Group 0 through Data Group 4, each provide for the storage of four data blocks and one parity block. The data blocks, numbered 0 through 19, are identified by reference numerals A0 through E4. Parity blocks are identified by reference numerals P0 through P4.

The location in which data and parity information are stored within the data groups varies from data group to data group. For example, in Data Group 0 data blocks A0, B0, C0 and D0 are stored on drives DRIVE A through DRIVE D and parity information P0 is saved on drive DRIVE E. However in Data Group 1 data blocks A1, B1, C1 and E1 are stored on drives DRIVE A, DRIVE B, DRIVE C, and DRIVE E, respectively, and parity information P1 is saved on drive DRIVE D. Within each data group, parity information is calculated by performing a bit-wise exclusive-OR of corresponding data blocks, or through the read-modify-write (RMW) operation. By varying the location of the parity information and distributing the parity information equally across the disk drives within the array, the primary shortcoming of the RAID level 4 disk array design, i.e., contention for access to the single dedicated parity disk, is greatly reduced.

Although only five data groups and twenty data blocks are illustrated, it should be understood that an array storage system utilizing current magnetic disk drives, such as the Western Digital Corporation WD Caviar AC36400 disk drive described above, is capable of storing millions of data blocks.

Figure 4:
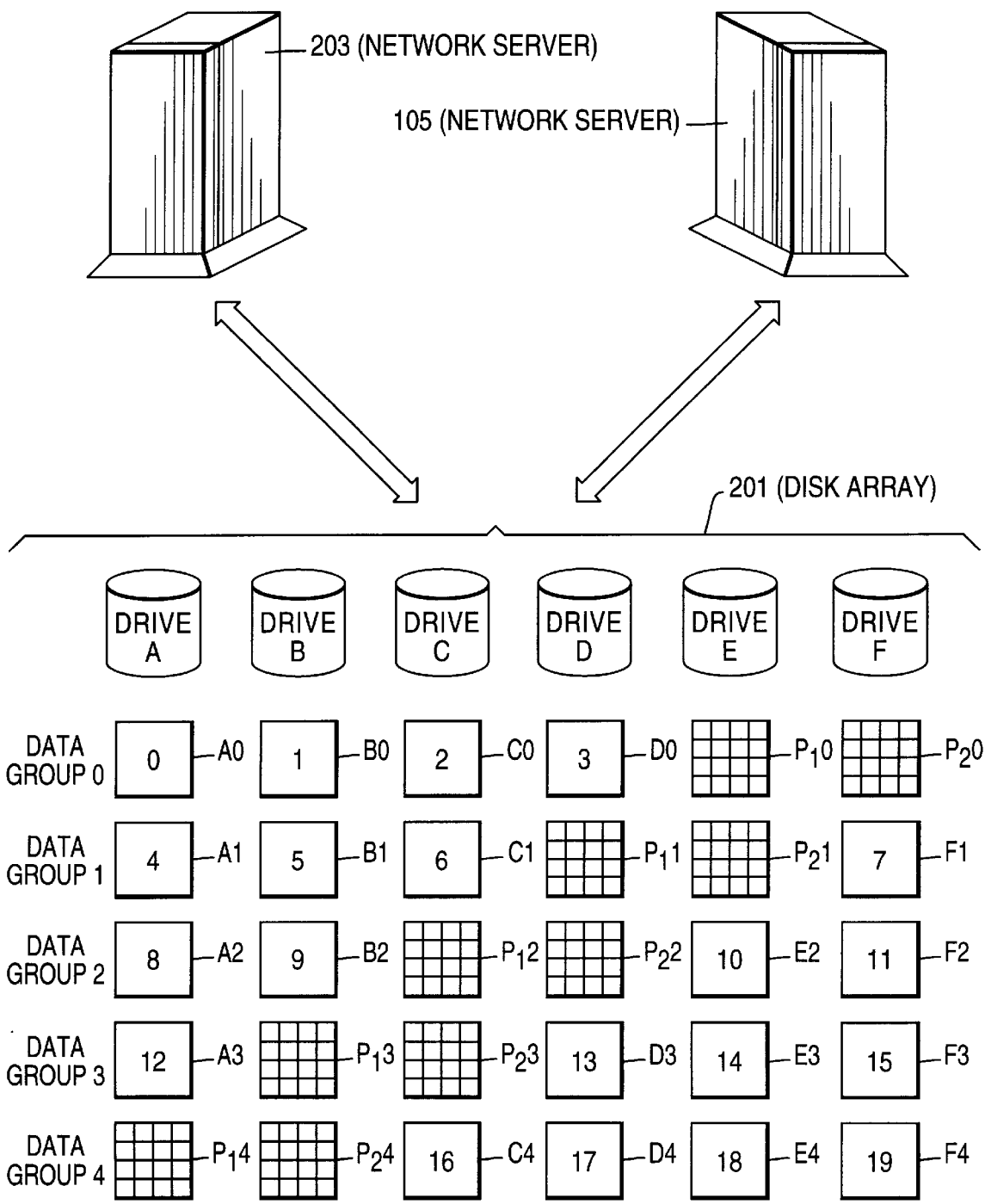
FIG. 4 is a block diagram representation of a network including a shared RAID level 5 disk array storage system including six disk drives for the storage of data and parity information in accordance with the present invention.

FIG. 4 illustrates an improvement to the RAID level 5 disk array system shown in FIG. 3. The system illustrated in FIG. 4 differs from the system shown in FIG. 3 by including six disk drives for the storage of data and parity information, identified as DRIVE A through DRIVE F, rather than five disk drives, as shown in FIG. 3.

The disk array storage system illustrated in FIG. 4 provides storage for twenty data blocks of data organized into five data groups. The data groups, identified as Data Group 0 through Data Group 4, each provide for the storage of four data blocks and two parity blocks. The data blocks, numbered 0 through 19, are identified by reference numerals A0 through F4. Parity blocks are identified by reference numerals $P_1 0$ through $P_1 4$ and $P_2 0$ through $P_2 4$.

As in the system shown in FIG. 3, the location in which data and parity information are stored within the data groups varies from data group to data group. For example, in Data Group 0 data blocks A0, B0, C0 and D0 are stored on drives DRIVE A through DRIVE D and parity information components $P_1 0$ and $P_2 0$ are saved on drives DRIVE E and DRIVE F. However in Data Group 2 data blocks A1, B1, C1 and F1 are stored on drives DRIVE A, DRIVE B, DRIVE C, and DRIVE F, respectively, while parity information components $P_1 1$ and $P_2 1$ are saved on drives DRIVE D and DRIVE E.

Parity information components $P_1 0$ through $P_1 4$, are calculated by server 203, while parity information components $P_2 0$ through $P_2 4$, is calculated by server 205. Each server is responsible for updating its piece of parity information for specific data modifications. For example, server 203, might be responsible for the parity generations associated with all data modifications originating with server 203, while server 205 would be responsible for the parity generations associated with all data modifications originating with server 205. Other methods for determining which server has responsibility for which data modifications and associated parity updates should be readily apparent to those skilled in the art. Each server determines parity through the read-modify-write operation as follows:

new parity $P_1 X$=old data$\oplus$new data$\oplus$old parity $P_1 X$; and new parity $P_2 X$=old data$\oplus$new data$\oplus$old parity $P_2 X$;

where parity $P_1$ is the parity information component determined by server 203, parity $P_2$ is the parity information component calculated by server 205, and X represents the data group for which parity is calculated.

Initially, all disks within the array will contain all zeros. Alternatively, the array may preloaded with data, in which case parity will need to be calculated and written to one of the two groups of parity data blocks, i.e., $P_1 X$ or $P_2 X$, the other group of data blocks containing all zeros. Over time, however, as each server writes new data and parity to the disk array storage system 101, neither parity information component $P_1$ or $P_2$ individually will represent the parity value determined by performing a bit-wise exclusive-OR of corresponding data blocks stored within a data group. However, because the exclusive-OR operation utilized to calculate parity is both associative and commutative, the complete parity for the disk array storage system can be determined by exclusive-ORing corresponding parity blocks within the data groups. The complete parity for any data group can be determined from the following equation:

parity $P=P_1 X \oplus P_2 X$.

SUMMARY

It can thus be seen that there has been provided by the present invention a new and useful method for calculating and storing data and parity information within a RAID level 4 or 5 disk array storage system. The above-described method extends the parity generating mechanism within the array to encompass multiple parity pieces rather than the single piece currently in use. Multiple parity pieces permits each piece to be assigned to a given parity generator/writer. This organization reduces the coordination required to maintain parity and increases array and system performance by reducing overhead and lock contention.

Those skilled in the art will recognize that the invention is not limited to the specific embodiments described above and that numerous modifications and changes are possible without departing from the scope of the present invention. For example, although the above detailed description describes disk array systems including a total of six disk drives for the storage of data and parity information, a greater number of drives may be utilized to store data and parity within the disk array. In such a system more than two additional drives may be provided to store components of parity information, with a corresponding number of processing nodes responsible for maintaining parity information. Also, in the RAID 5 disk array implementation described above, the manner in which parity information storage blocks is distributed throughout the multiple disk drives may differ from that shown.

These and other variations, changes, substitution and equivalents will be readily apparent to those skilled in the art without departing from the spirit and scope of the present invention. Accordingly, it is intended that the invention to be secured by Letters Patent be limited only by the scope of the appended claims.

What is claimed is:

1. A disk array storage system wherein data and related parity information are stored in corresponding storage blocks across a plurality of disk drives, said disk array storage system comprising:

a first disk drive including a storage block for the non-volatile storage of a first component of parity information;

a second disk drive including a storage block for the non-volatile storage of a second component of parity information;

at least two disk drives including corresponding storage blocks for the storage of data;

a first parity generating mechanism for calculating said first component of parity information stored on said first disk drive; and a second parity generating mechanism for calculating said second component of parity information stored on said second disk drive;

wherein the exclusive-OR combination of said first component of parity information with said second component of parity information is equivalent to the exclusive-OR combination of the data stored within the corresponding storage blocks of said at least two disk drives.

2. The disk array storage system in accordance with claim 1, wherein:

said disk array storage system is shared by a first processing node and a second processing node;

said first parity generating mechanism for calculating said first component of parity information is included in said first processing node; and said second parity generating mechanism for calculating said second component of parity information is included in said second processing node.

3. The disk array storage system in accordance with claim 2, wherein:

said first processing node processes a first group of processes performing updates on said data stored in said at least two disk drives including corresponding storage blocks for the storage of data; and said second processing node processes a second group of processes performing updates on said data stored in said at least two disk drives including corresponding storage blocks for the storage of data.

4. The disk array storage system in accordance with claim 2, wherein:
said first processing node utilizes a read-modify-write procedure to update said data and said first component of parity information; and
said second processing node utilizes a read-modify-write procedure to update said data and said second component of parity information.

5. A computer system comprising:
a first processing node;
a second processing node; and
a disk array storage system shared by said first and second servers, said disk array storage system including:
a first disk drive including a storage block for the non-volatile storage of a first component of parity information;
a second disk drive including a storage block for the non-volatile storage of a second component of parity information;
at least two disk drives including corresponding storage blocks for the storage of data;
a first parity generating mechanism included in said first processing node for calculating said first component of parity information stored on said first disk drive; and
a second parity generating mechanism included in said second processing node for calculating said second component of parity information stored on said second disk drive;
wherein the exclusive-OR combination of said first component of parity information with said second component of parity information is equivalent to the exclusive-OR combination of the data stored within the corresponding storage blocks of said at least two disk drives.

6. The computer system in accordance with claim 5, wherein:
said first processing node processes a first group of processes performing updates on said data stored in said at least two disk drives including corresponding storage blocks for the storage of data; and
said second processing node processes a second group of processes performing updates on said data stored in said at least two disk drives including corresponding storage blocks for the storage of data.

7. In a disk array storage system wherein data is stored in corresponding storage blocks across a plurality of disk drives, a method for calculating and storing parity information, said method comprising the steps of:
providing a first disk drive for the non-volatile storage of parity information, said first disk drive including a storage block corresponding to the storage blocks included in said plurality of disk drives;
providing a first parity generation mechanism for calculating a first component of parity information,
storing said first component of parity information in said storage block on said first disk drive;
providing a second disk drive for the non-volatile storage parity information; said second disk drive including a storage block corresponding to the storage blocks included in said plurality of disk drives and said first disk drive; and providing a second parity generation mechanism for calculating a second component of parity information, and
storing said second component of parity information in said storage block on said second disk drive;
wherein the exclusive-OR combination of said first component of parity information with said second component of parity information is equivalent to the exclusive-OR combination of the data stored within the corresponding storage blocks of said at least two disk drives.

8. The method for calculating and storing parity information in accordance with claim 7, further comprising the steps of:
updating said data and said first component of parity information in response to one of a first group of processes; and
updating said data and said second component of parity information in response to one of a second group of processes.

9. The method for calculating and storing parity information in accordance with claim 8, wherein:
said disk array storage system is shared by a first processing node and a second processing node;
said step of updating said data and said first component of parity information in response to one of a first group of processes is performed by said first processing node; and
said step of updating said data and said second component of parity information in response to one of a second group of processes is performed by said second processing node.

10. The method for calculating and storing parity information in accordance with claim 8, wherein:
said step of updating said data and said first component of parity information in response to one of a first group of processes includes the execution of a read-modify-write procedure; and
said step of updating said data and said second component of parity information in response to one of a second group of processes includes the execution of a read-modify-write procedure.

11. A disk array storage system comprising:
a plurality of disk drives for the storage of data and parity information, said data and parity information being stored in multiple data groups within a plurality of disk drives, each data group containing a corresponding storage block from each disk drive within said plurality of disk drives;
each data group including a first storage block for the non-volatile storage of a first component of parity information, a second storage block for the non-volatile storage of a second component of parity information, and at least two storage blocks for the storage of data;
a first parity generating mechanism for determining said first component of parity information; and
a second parity generating mechanism for determining said second component of parity information stored;
wherein the exclusive-OR combination of said first component of parity information with said second component of parity information is equivalent to the exclusive-OR combination of the data stored within the corresponding storage blocks of said at least two disk drives.

12. The disk array storage system in accordance with claim 11, wherein:

said disk array storage system is shared by a first processing node and a second processing node;

said first parity generating mechanism for calculating said first component of parity information is included in said first processing node; and said second parity generating mechanism for calculating said second component of parity information is included in said second processing node.

13. The disk array storage system in accordance with claim 12, wherein:

said first processing node processes a first group of processes performing updates on said data stored in said at least two storage blocks for the storage of data; and said second processing node processes a second group of processes performing updates on said data stored in said at least two disk drives including corresponding storage blocks for the storage of data.

14. The disk array storage system in accordance with claim 13, wherein:

said first processing node utilizes a read-modify-write procedure to update said data and said first component of parity information; and said second processing node utilizes a read-modify-write procedure to update said data and said second component of parity information.

15. The disk array storage system in accordance with claim 11, wherein:

the disk drive on which said first storage block resides and the disk drive on which said second storage resides varies in the multiple data groups.

16. The disk array storage system in accordance with claim 15, wherein:

said disk array storage system is shared by a first processing node and a second processing node;

said first parity generating mechanism for calculating said first component of parity information is included in said first processing node; and said second parity generating mechanism for calculating said second component of parity information is included in said second processing node.

17. The disk array storage system in accordance with claim 16, wherein:

said first processing node processes a first group of processes performing updates on said data stored in said at least two storage blocks for the storage of data; and said second processing node processes a second group of processes performing updates on said data stored in said at least two disk drives including corresponding storage blocks for the storage of data.

18. The disk array storage system in accordance with claim 17, wherein:

said first processing node utilizes a read-modify-write procedure to update said data and said first component of parity information; and said second processing node utilizes a read-modify-write procedure to update said data and said second component of parity information.

19. A method for storing data and parity information in a disk array, said method comprising the steps of:

providing a plurality of disk drives for the storage of data and parity information, said data and parity information being stored in multiple data groups within said plurality of disk drives, each data group containing a corresponding storage block from each disk drive within said plurality of disk drives, each data group including a first storage block for the nonvolatile storage of a first component of parity information, a second storage block for the non-volatile storage of a second component of parity information, and at least two storage blocks for the storage of data;

providing a first parity generation mechanism for calculating said first component of parity information;

providing a second parity generation mechanism for calculating said second component of parity information;

varying the location of said first storage block and said second storage among the plurality of disk drives in different ones of said multiple data groups; and within each data group:
determining said first component of parity information, storing said first component of parity information in said first storage block;
determining said second component of parity information, and
storing said second component of parity information in said second storage block;
wherein the exclusive-OR combination of said first component of parity information with said second component of parity information is equivalent to the exclusive-OR combination of the data stored within the corresponding storage blocks of said at least two disk drives.

20. The method for calculating and storing parity information in accordance with claim 19, further comprising the steps of:

updating said data and said first component of parity information within a data group in response to one of a first group of processes; and updating said data and said second component of parity information within a data group in response to one of a second group of processes.

21. The method for calculating and storing parity information in accordance with claim 20, wherein:

said disk array storage system is shared by a first processing node and a second processing node;

said step of updating said data and said first component of parity information within a data group in response to one of a first group of processes is performed by said first processing node; and said step of updating said data and said second component of parity information within a data group in response to one of a second group of processes is performed by said second processing node.

22. The method for calculating and storing parity information in accordance with claim 20, wherein:

said step of updating said data and said first component of parity information within a data group in response to one of a first group of processes includes the execution of a read-modify-write procedure; and said step of updating said data and said second component of parity information within a data group in response to one of a second group of processes includes the execution of a read-modify-write procedure.

* * * * *